Patented Oct. 14, 1941

2,258,639

UNITED STATES PATENT OFFICE 2,258,639

ELECTRIC IRON

William A. Barnes, Mansfield, Ohio, assignor to Dominion Electrical Manufacturing Company Application November 9, 1937, Serial No. 173,683

31 Claims. (Cl. 219—25)

My invention relates in general to electric irons and more particularly to electric flat irons.

An object of my invention is the provision of an electric iron having a cool handle and a cool shell surface beneath the handle when the iron is operating at relatively high temperature.

Another object of my invention is the provision of an electric iron having a cool back rest when the iron is operating at relatively high temperature.

Another object of my invention is the provision of an electric iron having a cool thermostatic control knob when the iron is operating at relatively high temperature.

Another object of my invention is the provision of an electric iron having a cool thermostatic control knob so that the control knob may be made of phenolic composition with a wood flour filler instead of an asbestos filler.

Another object of my invention is the provision of a thermostatic control knob for an electric iron in which the thermostatic control knob has a conductivity about one-fourth of a control knob made with phenolic composition having an asbestos filler.

Another object of my invention is the provision of an electric iron having a cool shell surface to which the handle of the iron is attached so that the cool shell surface will not damage the phenolic composition handle which is likely to happen if the shell surface is too hot.

Another object of my invention is the provision of an electric iron having a handle supported upon the shell surface of the iron by insulating washers to reduce the temperature of the handle.

Another object of my invention is the provision of an electric iron capable of keeping a relatively large temperature difference between the base of the iron and the shell surface beneath the handle.

Another object of my invention is the provision of an electric iron having a thermostatic device and a control knob in which the heat transmitted from the thermostatic device to the control knob is reduced to a minimum.

Another object of my invention is the provision of an electric iron arranged to be electrically connected to a detachable plug in which the shell and the handle extend rearwardly of the base and constitute a back rest for the iron and in which the back of the handle is removed to provide space for the detachable plug.

Other objects and a fuller understanding of my invention may be had from the following description and claims, taken in conjunction with the accompanying drawing, in which like parts are designated by like reference characters, and in which:

Figure 1 is a longitudinal cross-sectional view of an iron embodying the features of my invention;

Figure 2 is a plan view of an iron embodying the features of my invention with the handle and the over-shell removed and with the intermediate shell and a portion of the base cut away to illustrate the construction of my electric iron; and Figure 3 is a plan view of an electric iron embodying the features of my invention with the handle removed and with the portion of the over-shell cut away to illustrate the construction of my electric iron.

With reference to the drawing, my electric iron comprises in general a base 10, an intermediate shell 11, and an over-shell 12. The intermediate shell 11 comprises a top surface 15 and marginal side means 13 extending downwardly and engaging the base 10. The central longitudinal portion of the top surface 15 of the intermediate shell 11 is bulged upwardly forming a raised portion 16 to provide space for the thermostatic device indicated generally by the reference character 32. The intermediate shell 11 may be securely fastened to the base 10 by means of an upright stud 35 having its lower end suitably connected to the base 10 and having its upper end projected through an opening in the top surface of the intermediate shell 11 to which a nut 36 is threadably engaged.

The over-shell 12 is provided with marginal edge means 14 which engage the top surface 15 of the intermediate shell 11. A suitable screw 37 which extends through an opening in the top surface of the over-shell 12 and threadably engages the threaded opening 38 in the upwardly bulged portion 16 is arranged to securely fasten the over-shell to the intermediate shell 11. The screw 37 is placed as far as possible from the stud 35 in order to reduce heat conductivity to the over-shell 12. As illustrated, the marginal side means 13 of the intermedite shell 11 and the over-shell 12 constitutes the outer surface of the iron above the base 10.

A suitable handle 17 is connected to the top surface of the over-shell 12. As illustrated, the front part 18 of the handle 17 may be connected to the over-shell 12 by means of a screw 21 extending through a hole 25, with an insulating washer 22 placed between the upper surface insulating washers 22 and 24 above the over-shell 12, the contact temperature of the phenolic composition handle 17 is 300° F. or less. The temperature is sufficiently low that no metal inserts in the handle need to be employed to dissipate the heat so as not to deteriorate the phenolic composition. The low temperatures of the over-shell 12 proportionately keep the control knob 47 cool with the result that an electric iron constructed in accordance with the features of my invention provides a relatively cool handle, a relatively cool control knob, and a relatively cool shell surface beneath the handle.

The inside and outside surfaces of the intermediate shell 11 and the over-shell 12 are arranged to have a low radiation emissivity. This may be obtained by chromium plated or aluminum surfaces, preferably polished. Radiation forms the major part of the heat transfer to the over-shell 12 and handle. Therefore, the low radiation emissivity of the intermediate shell surfaces materially reduces the heat transfer to the over-shell. Similarly, the low radiation emissivity of the surfaces of the over-shell materially reduces the heat transfer to the handle. Radiation is expressed as a fourth power of the temperature in absolute units times the emissivity constant of the surface in question. Thus, the radiation from a 400° F. surface is approximately 64% greater than the radiation from a 300° F. surface. The above serves to illustrate the effectiveness of the over-shell 12 both to intercept the radiation from the intermediate shell 11 and to reflect back such radiation to reduce the radiation to the handle. The emissivity of black bodies is taken as 100. The emissivity of polished aluminum is 6. By constructing the over-shell 12 of polished aluminum, it only absorbs 6% of the radiation coming to it from the intermediate shell 11. The combined effect of the low emissivity and the fourth power of the absolute temperature makes the over-shell 12 and the handle cool.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

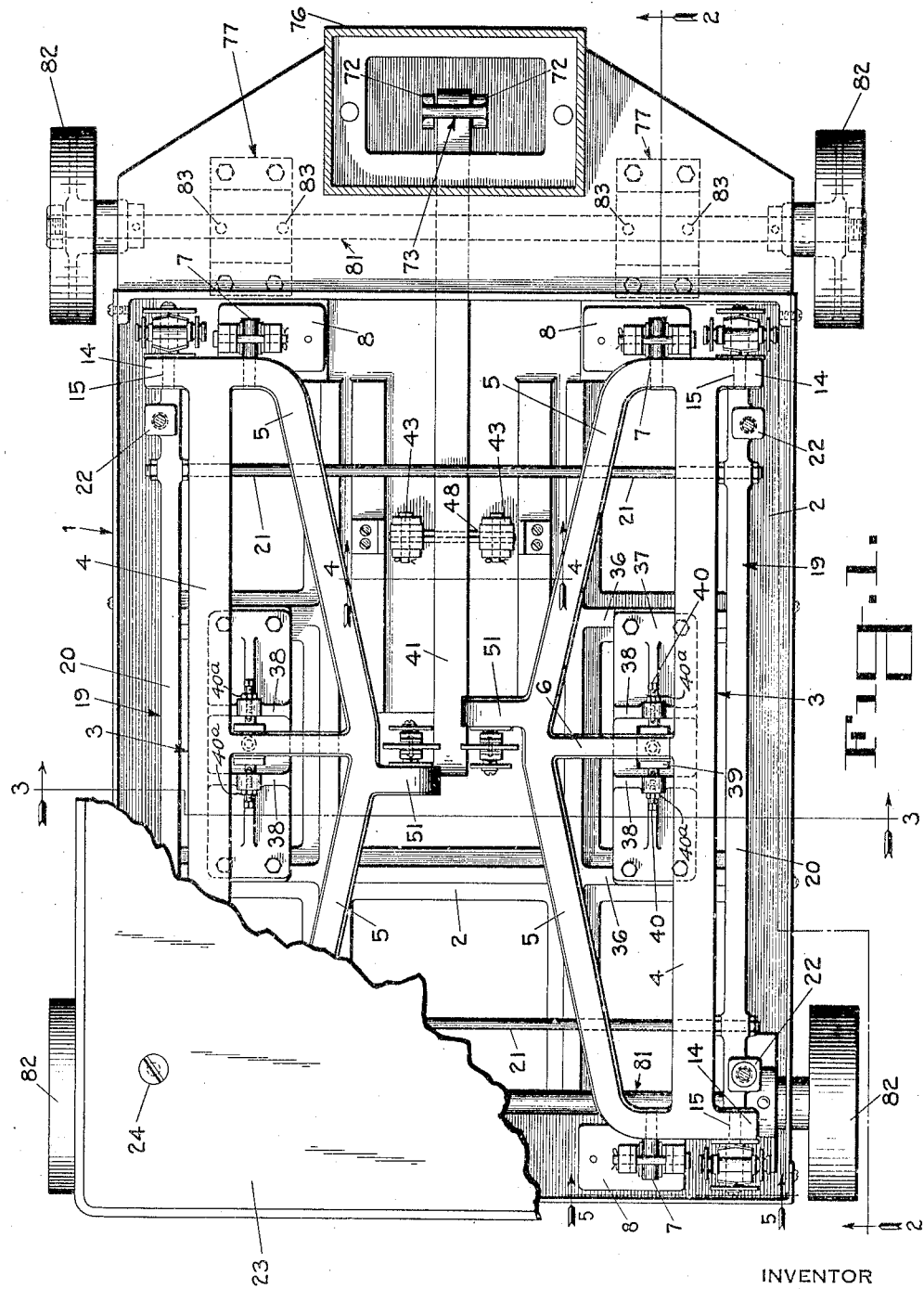

I claim as my invention:

1. An electric iron having a handle comprising, in combination, a base, a heating element superimposed on the base, an intermediate shell positioned over the heating element and having marginal side means extending downwardly and engaging the base, an over-shell positioned over, and having marginal edge means engaging, the intermediate shell, and means for fastening the handle to the over-shell.

2. An electric iron having a handle comprising, in combination, a base, a heating element superimposed on the base, an intermediate shell positioned over the heating element and having marginal side means extending downwardly and engaging the base, an over-shell positioned over, and having marginal edge means engaging, the intermediate shell, and means for fastening the handle to the over-shell, said over-shell and handle extending rearwardly of the base, and constituting a back rest for the iron.

3. An electric iron having a handle comprising, in combination, a base, a heating element superimposed on the base, an intermediate shell positioned over the heating element and having marginal side means extending downwardly and engaging the base, an over-shell positioned over, and having marginal edge means engaging, the intermediate shell, and means for fastening the handle to the over-shell, the marginal side means of the intermediate shell and the over-shell constituting the outer surface of the iron above the base.

4. An electric iron having a handle and a relatively cool shell surface beneath the handle comprising, in combination, a base, a heating element superimposed on the base, shell means fastened to the base and constituting the upper shell portion of the iron, means for mounting the handle on the shell means, said shell means comprising two compartments, one of said compartments enclosing the heating element and the other of said compartments constituting an insulating space above the first compartment to keep the shell surface beneath the handle relatively cool, said compartment which constitutes an insulating space being spaced from said base.

5. An electric iron having a handle and a relatively cool shell surface beneath the handle comprising, in combination, a base, a heating element superimposed on the base, shell means fastened to the base and constituting the upper shell portion of the iron, means for mounting the handle on the shell means, said shell means comprising two compartments, one of said compartments enclosing the heating element and the other of said compartments constituting an insulating space above the first compartment to keep the shell surface beneath the handle relatively cool, said compartment which constitutes an insulating space being spaced from said base, and said shell means being capable of keeping a temperature difference of more than 200° F. between the base and the shell surface beneath the handle.

6. An electric iron having a handle and a relatively cool shell surface beneath the handle comprising, in combination, a base, a heating element superimposed on the base, shell means fastened to the base and constituting the upper shell portion of the iron, means for mounting the handle on the shell means, said shell means comprising two compartments, one of said compartments enclosing the heating element and the other of said compartments constituting an insulating space above the first compartment to keep the shell surface beneath the handle relatively cool, said compartment which constitutes an insulating space being spaced from said base, and said shell means being capable of keeping the shell surface beneath the handle at a temperature less than 325° F. with a base temperature of 525° F.

7. An electric iron having a handle and a thermostatic control knob comprising, in combination, a heated base, a thermostatic device responsive to the temperature of the heated base, shell means fastened to the base and constituting the upper shell portion of the iron, said shell means comprising an enclosing portion which engages the heated base and encloses the said thermostat and an insulating portion which is mounted on the enclosing portion and is spaced from the heated base, means for movably mounting the control knob upon the shell means, and motion transmitting means for causing movement of the control knob to regulate the thermostatic device, said motion transmitting means including a member having spaced means and another member having engaging means loosely positioned between the spaced means for transmitting movement from one member to the other.

8. An electric iron arranged to be electrically connected to a detachable plug comprising, in combination, an electrically heated base, a shell attached to the base, a handle fastened to the shell, said shell and handle extending rearwardly of the base and constituting a back rest for the iron, a heating element superimposed on the base, contact engaging pins electrically connected to the heating element, means for positioning the contact engaging pins between the back of the handle and the rearward extension of the shell, said rearward portion of the handle being removed to provide space for the detachable plug.

9. An electric iron having a handle comprising, in combination, a base, a heating element positioned to heat said base, a first shielding means positioned over said heating element and engaging said base to enclose said heating element, a second shielding means positioned over and attached to said first shielding means, said second shielding means being spaced from said base, and means for fastening said handle to said second shielding means.

10. An electric iron having a handle comprising, in combination, a base, a heating element positioned to heat said base, a first shielding means positioned over said heating element and having marginal side means extending downwardly and engaging the base, a second shielding means positioned over and attached to and spaced from said first shielding means, said second shielding means also being spaced from said base, and means for attaching the handle to the second shielding means.

11. An electric iron having a handle comprising, in combination, a base, a heating element positioned to heat said base, a shell portion positioned over said heating element and engaging said base to enclose said heating element, said shell portion having marginal sides extending upward and inward from said base into a top surface having a raised central portion, the marginal edge of said top surface being substantially flat, a heat shielding cover attached to said shell portion and spaced from said base, and substantially covering said top surface, and means for attaching said handle to said heat shielding cover, said heat shielding cover having holes therethrough adapted to receive said handle attaching means.

12. An electric iron having a handle comprising, in combination, a base having an attaching post, a heating element positioned to heat said base, a shell portion positioned over said heating element and engaging said base to enclose said heating element, screw means through said shell and engaging said post to attach said shell to said base, said shell portion having marginal sides extending upward and inward from said base into a top surface, said top surface being substantially flat around its marginal edges and having a raised central portion, a heat shielding means attached to and spaced from said raised central shell portion and substantially covering said top surface, means for attaching said handle to said heat shielding means, said heat shielding means having holes through the rearward and forward portions adapted to receive said handle attaching means, a thermostat positioned between said base and said shell portion and adapted to regulate the heating element, thermostat actuating means for said thermostat extending through said shell portion and said heat shielding means, and control means attached to said thermostat actuating means manually operable to set said thermostat to regulate the heating element.

13. An electric iron having a handle comprising, in combination, a base, a heating element positioned to heat said base, hand shielding means comprising a shell shielding portion and a top shielding portion, said shell shielding portion engaging said base and covering the heating element, said shielding means and said handle extending rearwardly of said base to constitute a back rest for said iron, an attaching post attached to said base, screw means through said shell shielding portion and engaging said post to attach said shell shielding portion to said base, said shell shielding portion having marginal sides extending upward from said base into a top surface, the marginal edge of said top surface being substantially flat, said top shielding portion attached to and having portion means spaced from said shell shielding portion and substantially covering said top surface, means for attaching said handle to said top shielding portion, said top shielding portion having holes through the rearward and forward portions adapted to receive said handle attaching means, a thermostat positioned between said base and said shell shielding portion and adapted to regulate the heating element, thermostat actuating means for said thermostat extending through holes in said shell shielding portion and said top shielding portion and control means attached to said thermostat actuating means and manually operable to set said thermostat to regulate the heating element.

14. An iron adapted to be energized by electric current comprising, in combination, a base, a heating element positioned to heat said base, a handle, shielding means positioned to shield said handle from said heating element, said handle and said shielding means extending rearwardly of said base and constituting a back rest for said iron, said shielding means comprising a shell shielding portion and a top shielding portion, an attaching post attached to said base, means through said shell shielding portion and engaging said attaching post to attach said shell shield to said base, said shell shielding portion having marginal sides extending upwardly from said base into a top surface, said top shielding portion being spaced from and attached to said shell shielding portion and substantially covering said top surface, means for attaching said handle to said top shielding portion, said top shielding portion having holes adapted to receive said handle attaching means, terminal means extending through openings in said shell shielding portion and said top shielding portion and positioned near the rear of said handle and adapted to receive the electric current, a thermostat positioned between said base and said shell shielding portion and adapted to regulate the flow of the electric current through the heating element, thermostat actuating means for said thermostat extending through holes in said shell shielding portion and said top shielding portion, and control means for said thermostat actuating means manually operable to set said thermostat to regulate the heating element.

15. An iron adapted to be energized by electric current comprising, in combination, a base, a heating element positioned to heat said base, a handle, shielding means positioned to shield said handle from said heating element, said handle and said shielding means extending rearwardly of said base and constituting a back rest for said iron, said shielding means comprising a shell shielding portion and a top shielding portion, an attaching post attached to said base, means through said shell shielding portion and engaging said attaching post to attach said shell shield to said base, said shell shielding portion having marginal sides extending upwardly from said base into a top surface, said top shielding portion being spaced from and attached to said shell shielding portion, and substantially covering said top surface, means for attaching said handle to said top shielding portion, said top shielding portion having holes adapted to receive said handle attaching means, terminal means extending through openings in said shell shielding portion and said top shielding portion near the rear of said handle and adapted to receive the electric current, said top shielding portion substantially covering said shell shielding portion rearwardly of said terminal means, a thermostat positioned between said base and said shell shielding portion and adapted to regulate the flow of the electric current through the heating element, thermostat actuating means for said thermostat extending through holes in said shell shielding portion and said top shielding portion, and control means for said thermostat actuating means manually operable to set said thermostat to regulate the heating element.

16. An electric iron having a handle comprising, in combination, a base, a heating element positioned to heat said base, a shell portion positioned over said heating element and having side means engaging the base, a top portion attached to said shell portion, and spaced from said base and means for attaching said handle to said top portion, said shell portion being polished to reduce the heat emissivity, and said top portion being polished to increase the reflection of heat radiated from the shell portion and to reduce the heat emissivity.

17. An electric iron having a handle and a thermostat, a thermostat control knob, and means for transmitting motion from said knob to said thermostat, comprising, in combination, a base, a heating element positioned to heat said base, an intermediate shell positioned over the heating element and having marginal side means extending downwardly and engaging the base, an over-shell positioned over and having marginal edge means engaging the intermediate shell, said motion transmitting means being positioned between said shells, and means for fastening the handle to the over-shell.

18. An electric iron having a handle comprising, in combination, a base, a heating element positioned to heat said base, an intermediate heat reflecting means positioned over the heating element and having marginal side means extending downwardly and engaging the base, a top heat reflecting means positioned over and fastened to said intermediate heat reflecting means, and spaced from said base, and means for fastening the handle to the top heat reflecting means.

19. An electric iron having a handle comprising, in combination, a base, a heating element positioned to heat said base, first shielding means engaging said base and positioned over said heating element and having a low radiation emissivity, second shielding means positioned over said first shielding means and spaced from said base and having a low radiation emissivity, said second shielding means being fastened to said first shielding means and said handle being fastened to said second shielding means.

20. An electric iron arranged to be electrically connected to a detachable plug comprising, in combination, an electrically heated base, an intermediate shell positioned over said base and having marginal side means engaging the base, an over-shell positioned over, and having marginal side means engaging the intermediate shell, a handle fastened to the over-shell, one of said shells and the handle extending rearwardly of the base and constituting a back rest for the iron, a heating element positioned between said base and said intermediate shell, contact engaging pins electrically connected to the heating element and positioned between the back of the handle and the rearward extension of the shell, said rearward portion of the handle being removed to provide space for the detachable plug.

21. An electric iron having a handle comprising, in combination, a base having an attaching post, a heating element positioned to heat said base, a shell portion positioned over said heating element and engaging said base to enclose said heating element, screw means through said shell and engaging said post to attach said shell to said base, said shell portion having marginal sides extending upward and inward from said base into a top surface, a heat shielding means attached to and spaced from said shell portion and spaced from said base and substantially covering said top surface, means for attaching said handle to said heat shielding means, said heat shielding means having holes through the rearward and forward portions adapted to receive said handle attaching means, a thermostat positioned between said base and said shell portion and adapted to regulate the heating element, thermostat actuating means for said thermostat extending through said shell portion and said heat shielding means, and control means attached to said thermostat actuating means manually operable to set said thermostat to regulate the heating element.

22. An electric iron having a handle comprising, in combination, a base, a heating element positioned to heat said base, a plurality of heat shielding means positioned between said base and said handle, one shielding means engaging said base and the other shielding means being spaced from said base and supported on said base engaging shielding means and means for fastening said handle, heat shielding means and base together.

23. An electric iron comprising, in combination, a handle, a base, a heating element positioned to heat said base, a plurality of heat shielding means positioned between said base and said handle, one shielding means engaging said base and the other shielding means being spaced from said base and supported on the base engaging shielding means, and means for fastening said handle, said shielding means and said base together; and one of said shielding means and said handle extending rearwardly to form a back rest for said iron.

24. A control for an electric iron having a base and a thermostat mounted thereon comprising, in combination, an intermediate shell positioned over said base and substantially enclosing said thermostat in a first enclosure, an over-shell positioned over and spaced from the said intermediate shell to establish a second enclosure, a screw for regulating said thermostat, said screw extending from said first enclosure into said second enclosure, an arm positioned in said second enclosure and attached to said screw, a second arm in said second enclosure loosely engaging said first arm, a control knob mounted on the outside of said over-shell and means connected to the control knob and extending through the said over-shell and connected to the said second arm whereby actuation of the control knob will adjust the said thermostat.

25. A control device for an electric iron having a heated base and a thermostat mounted on said base comprising, in combination, first shell means attached to the base and enclosing the thermostat in a heated zone, second shell means mounted above said first shell means and establishing an insulating zone, first turnable control means for actuating the thermostat extending from said heated zone into said insulating zone, a control knob mounted externally of the second shell means, second turnable control means actuated by the control knob and extending through the said second shell means into said insulating zone, one of said control means having an engaging end in said insulating zone adapted to loosely engage said other control means for transmitting motion from one control means to the other, said loose engagement between said control means minimizing the heat conduction from one control means to the other and said loose engagement being effected in the said insulating zone at a distance from the points at which the first and second control means enter the insulating zone thereby establishing a relatively long path of heat conduction between the first control means and the second control means.

26. A control for an electric iron having a base and a thermostat mounted thereon comprising, in combination, an intermediate shell positioned over said base and substantially enclosing said thermostat to establish a first enclosure, an over-shell positioned over and spaced from the said intermediate shell to establish a second enclosure, a screw for regulating said thermostat, said screw extending from said first enclosure into second enclosure, an arm positioned in said second enclosure and attached to said screw, a second arm in said second enclosure loosely engaging said first arm, a control knob mounted on the outside of said over-shell and means connected to the control knob and extending through the said over-shell and connected to the said second arm whereby actuation of the control knob will adjust the said thermostat.

27. A control device for an electric iron having a heated base and a thermostat mounted on said base comprising, in combination, first shell means attached to the said base and enclosing the said thermostat in a heated zone, second shell means mounted above said first shell means and establishing an insulating zone, first turnable control means for actuating the thermostat extending from said heated zone into said insulating zone, a control knob mounted externally of the second shell means, second turnable control means actuated by the control knob and extending through the said second shell means into said insulating zone, one of said control means having an engaging end in said insulating zone adapted to loosely engage said other control means for transmitting motion from one control means to the other, said loose engagement between said control means minimizing the heat conduction from one control means to the other and said loose engagement being effected in the said insulating zone at a distance from the points at which the first and second control means enter the insulating zone thereby establishing a relatively long path of heat conduction between the first control means and the second control means.

28. A control for an electric iron having a base and a thermostat mounted thereon comprising, in combination, a shell positioned over said base and substantially enclosing said thermostat to establish an enclosure, a shield positioned over and spaced from the said shell to establish space, a screw for regulating said thermostat, said screw extending from said enclosure into said space, an arm positioned in said space and attached to said screw, a second arm in said space loosely engaging said first arm, a control knob mounted on the outside of said shield, and connected to the said second arm whereby actuation of the control knob will adjust the said thermostat.

29. An electric iron having a handle comprising, in combination, a base, a heating element positioned to heat said base, a first shielding means positioned over said heating element and having marginal side means extending downwardly and engaging the base, means securing the first shielding means to the base, a second shielding means positioned over and spaced from said first shielding means, said second shielding means also being spaced from said base, means of relatively small contact area securing the second shielding means to the first shielding means positioned at a distance from the first mentioned securing means, and means for attaching the handle to the second shielding means.

30. An electric iron having a handle comprising, in combination, a base, a heating element positioned to heat said base, hand shielding means comprising a shell shielding portion and a top shielding portion, said shell shielding portion engaging said base and covering the heating element, said shielding means and said handle extending rearwardly of said base to constitute a back rest for said iron, securing means to attach said shell shielding portion to said base, said shell shielding portion having marginal sides extending upward from said base into a top surface, said top shielding portion being spaced from said shell shielding portion and substantially covering said top surface, means of relatively small contact area securing the top shielding portion to the shell shielding portion positioned at a distance from the first mentioned securing means, means for attaching said handle to said top shielding portion, a thermostat positioned between said base and said shell shielding portion and adapted to regulate the heating element, thermostat actuating means for said thermostat extending through said shell shielding portion and said top shielding portion, and control means attached to said thermostat actuating means and manually operable to set said thermostat to regulate the heating element.

31. An electric iron having a handle comprising, in combination, a base, a heating element positioned to heat said base, a first shielding means positioned over said heating element and having marginal side means extending downwardly and engaging the base, means securing the first shielding means to the base, a second shielding means positioned over and spaced from said first shielding means, said second shielding means also being spaced from said base, means of relatively small contact area for securing the second shielding means to the first shielding means positioned at a distance from the first mentioned securing means, and means for attaching the handle to the second shielding means, a thermostat positioned between said base and said first shielding means and adapted to regulate the flow of the electric current through the heating element, thermostatic actuating means for said thermostat extending through said first and second shielding means, and control means attached to said thermostat actuating means and manually operable to set said thermostat to regulate the heating element.

WILLIAM A. BARNES.